US011925596B2

(12) United States Patent
Belforte et al.

(10) Patent No.: US 11,925,596 B2
(45) Date of Patent: Mar. 12, 2024

(54) SYSTEM FOR REHABILITATING THE WALK AND WEIGHT SUPPORTING DEVICE FOR SUCH

(71) Applicant: NIMBLE ROBOTICS S.R.L., Turin (IT)

(72) Inventors: Guido Belforte, Turin (IT); Carlo Belforte, Turin (IT); Enrico Bisetti, Turin (IT); Silvia Alessandra Sirolli, Turin (IT)

(73) Assignee: NIMBLE ROBOTICS S.R.L., Turin (IT)

( * ) Notice: Subject to any disclaimer, the term of this patent is extended or adjusted under 35 U.S.C. 154(b) by 530 days.

(21) Appl. No.: 16/982,371

(22) PCT Filed: Feb. 26, 2019

(86) PCT No.: PCT/IT2019/000017
§ 371 (c)(1),
(2) Date: Sep. 18, 2020

(87) PCT Pub. No.: WO2019/180751
PCT Pub. Date: Sep. 26, 2019

(65) Prior Publication Data

US 2021/0030615 A1 Feb. 4, 2021

(30) Foreign Application Priority Data

Mar. 23, 2018 (IT) ........................ 102018000003889

(51) Int. Cl.
*A61H 3/00* (2006.01)
*A61H 1/02* (2006.01)

(52) U.S. Cl.
CPC ........... *A61H 3/008* (2013.01); *A61H 1/0262* (2013.01); *A61H 1/0266* (2013.01);
(Continued)

(58) Field of Classification Search
CPC ............ A61H 3/008; A61H 2001/0211; A61H 1/0262; A61H 1/0266; A61H 2201/1215;
(Continued)

(56) References Cited

U.S. PATENT DOCUMENTS 5,662,560 A * 9/1997 Svendsen ........... A63B 71/0009 482/54
7,381,163 B2 * 6/2008 Gordon .................. A63B 22/02 482/69

(Continued)

*Primary Examiner* — Samchuan C Yao
*Assistant Examiner* — Tina Zhang
(74) *Attorney, Agent, or Firm* — Maschoff Brennan

(57) ABSTRACT

A system is described, for rehabilitating the walk comprising an active exoskeleton with a supporting structure for right leg and left leg, bearing and moving structures of femur, tibia and foot of the patient, a weight supporting device for patient and active exoskeleton, the weight supporting device ending with a structure connected to means for supporting exoskeleton and patient, handling means connected to the weight supporting device to allow its movement, means for transmitting to the weight supporting device electric and pneumatic supplies and electric signals for managing, controlling, monitoring and diagnosing the system, a managing system comprising a microprocessor for acquiring and processing data, and managing a motion neuro-rehabilitation session; a weight supporting device for a system for rehabilitating the walk is further described.

6 Claims, 9 Drawing Sheets

(52) U.S. Cl.
CPC ................ *A61H 2201/1215* (2013.01); *A61H 2201/1246* (2013.01); *A61H 2201/149* (2013.01); *A61H 2201/1642* (2013.01); *A61H 2201/1652* (2013.01)

(58) Field of Classification Search
CPC ...... A61H 2201/1246; A61H 2201/149; A61H 2201/1642; A61H 2201/1652; A61H 1/0255; A61H 3/00; A61H 2201/165; A62B 35/00; A47D 13/04
See application file for complete search history.

(56) References Cited

U.S. PATENT DOCUMENTS

2001/0027149 A1* 10/2001 Bingham ............. A47D 13/046
482/69
2004/0102723 A1* 5/2004 Horst ..................... A61H 3/008
601/5
2004/0143198 A1* 7/2004 West .................... A61H 1/0262
601/5
2010/0271051 A1* 10/2010 Sankai ................. A61B 5/1038
324/679
2013/0116604 A1* 5/2013 Morilla .................... A63G 9/12
601/33
2014/0087922 A1* 3/2014 Bayerlein ........ A63B 21/00181
482/54
2018/0071580 A1* 3/2018 Lee .......................... A61H 3/00
2018/0085278 A1* 3/2018 Maekita ............... A61H 1/0244

* cited by examiner

SYSTEM FOR REHABILITATING THE WALK AND WEIGHT SUPPORTING DEVICE FOR SUCH

BACKGROUND OF THE INVENTION

1) Field of the Invention

The present invention refers to a system for rehabilitating the walk and to a weight supporting device for such system.

In particular, the invention refers to a system for rehabilitating the walk, to allow a person to perform walking exercises, or to lift the person completely from the ground for walking exercises in air, or to allow his rotation by 180° at the end of a path on the ground and start a new walking exercise.

The system finds its application connected to an exoskeleton and to a system for walk on the ground or for walking on a conveyor belt. The fields of application of the invention therefore are those of the assistance and of the rehabilitation and of the sports activities.

2) Background Art

In the field of the robotized rehabilitation of the walk, it is necessary to use apparatuses capable of moving the legs according to predefined motion laws, unburdening at the same time the legs from the weight of the patient, to prevent them from being excessively loaded, above all during the earlier phases of a therapeutic treatment.

The known art in the sector of robotized apparatuses for rehabilitating the walk comprises many models with different mechanisms and technologies for actuating the leg articulation, both of the type with fixed station, and of the mobile type on the ground. All devices perform the movements of hip and knee; only some of them also move the ankle, while other leave the foot free, entrusting it to the activation of the patient's muscles, or use simple recall systems, for example based on springs, to avoid stumbling during a walk. The unburdening of the weight occurs by supporting the body of the patient with a suitable harness connected to Body Weight Support, or BWS, devices.

Weight unburdening systems are known, suitable for rehabilitation systems which develop the walk on the ground, developed for rehabilitating the walk on the ground without an active exoskeleton, for example disclosed in documents U.S. Pat. No. 7,883,450 B1 and US-A1-2014/0201906.

These systems have the problem of being very complex, heavy and costly.

Weight lifting and unburdening systems are further known, used for rehabilitation, both for walking on the ground, and for walking on conveyor belt, which use various devices for compensating the vertical body motion.

The main techniques used in these systems are: elastic springs, balancing masses, automatic systems with force measurement, pneumatic systems.

As regards systems with springs:

U.S. Pat. No. 6,244,991 B1 discloses a system with walk on the ground and weight supporting device (BWS) on upper guides which provides for the use of a connecting spring between the end of a lifting rope and the patient suspending cross-member, in parallel to a dampening device.

U.S. Pat. No. 5,704,881 B1 discloses a system with conveyor belt without exoskeleton which provides for a spring connected at the end of a lifting rope fastened to a frame to unburden the patient and compensate its oscillations; the spring is adjusted and tensioned by a linear actuator.

U.S. Pat. No. 6,273,844 B1 discloses a system with conveyor belt without exoskeleton which provides for a pneumatic lifting system to unburden the weight and a system of springs to compensate the small oscillations of the walk.

These prior art systems with springs are simple, but have in general limits for regulating the force and for keeping its value during the oscillation of the patient body two to the unavoidable variation of the spring length.

The systems with balancing masses, for example disclosed in patent application US-A1-2013/0137553 (LOKOMAT System), have problems in the step of reversing the movement direction of the masses, with dynamic actions which disturb the patient.

As regards systems with closed loop ring:

US-A12016/0256346, U.S. Pat. No. 7,883,450 B 1 and US-A1-2014/0201905 disclose electronic control systems with sensors.

CN-A1-101518490 discloses a system which uses an adjustment with constant lifting force depending on the use of a load cell which controls the movement of an electric motor which moves an end of a lifting rope.

U.S. Pat. No. 7,462,138 B1 discloses a system which provides for controlling the vertical force with sensors and electronic system.

U.S. Pat. No. 7,381,163 B1 discloses a system with conveyor belt without exoskeleton which provides for an electric system for adjusting the position of a rope placed on a fixed frame and a pneumatic or hydraulic cylinder, controlled by a closed loop control which regulates the value of the rope tension with a force sensor, to allow the oscillations during a walk on a conveyor belt. The adjustment of the rope with an electric system which provides for moving the fluid actuator requires an adequate overall length and does not allow using the system on mobile BWS on a ceiling. The system, by placing the two electric and fluid systems on a BWS connected to a track on the ceiling, allows the walk on the ground, making the rehabilitation exercises more natural. Moreover, the system is simplified by removing the force sensor and controlling in a closed loop, which are replaced with a constant pressure adjustment.

These known systems with closed loop control can be very accurate, but have the problem of requiring dedicated instruments, with a force sensor, and are in general rather complex.

As regards systems based on compressed air devices:

U.S. Pat. No. 5,372,561 B1 provides for a system for suspending a patient which performs exercises on a conveyor belt without exoskeleton. The suspension occurs with a harness with two suspension belts (right shoulder and left shoulder) connected to a cross-member rotating with respect to the fixed frame and capable of being lifted with two pneumatic cylinders connected to a tank, whose thrust pressure is controlled by a pressure transducer and supply and discharge solenoid valves. This system requires moving a cross member with big sizes and therefore managing big masses, with problems for keeping a constant force in the motion reversal step, which is the actual particularly critical step to avoid unpleasant sensations to the patient. The system allows a rehabilitation with the use of exoskeleton and walk on the ground (two to the use of BWS connected to a track on the ceiling) and improves the suspension conditions using the pneumatic balancing system (similar in its operating principle) to actuate the vertical movement of a band which is connected to a harness to which the patient who wears the exoskeleton is suspended, which in turn is supported by a separate harness not to discharge its own weight on the patient, moving neglected device masses. The connection between band and harnesses can occur by collecting all harness belts in the same area with a collecting element or using a suspension cross member. Both connections allow an efficient and comfortable walk for the patient also in case of a limited incorrect adjustment of the lengths of the belts of the right side and of the left side of the harness. With a connection of all belts in a single zone, a not neglected variation of the position of the patient takes back to align its barycentre with the lifting band. With a connection with suspension cross member, a spontaneous small inclination of the cross member takes to compensate the small length differences of the belts of the right side and of the left side and to re-balance the loads.

US-A1-2004/0005962 discloses a system which operates with conveyor belt without exoskeleton, and provides for a double connection system to the patient, the first for the suspension and the second (with pneumatic device) for compensating oscillations with reduced amplitude. The system requires big support structures and big masses and can operate only with a fixed station. The system allows rehabilitating with walk on the ground and use of exoskeleton, two to the application in a BWS connected to a track on the ceiling. It moves neglected masses, using the pneumatic balancing system to actuate the vertical movement of a single band which is connected to the harness to which the patient is suspended and to the exoskeleton harness with a pulley, avoiding unpleasant sensations to the patient. It improves the conditions of the suspension, using a unique system for the suspension and for oscillation and avoiding a double connection system to the patient.

Prior art systems for rehabilitating the walk substantially provide for two types of robotized apparatuses, which can be used for a rehabilitation.

Systems expressly dedicated to a rehabilitation are a fixed structure without any chance of walking on the ground and use conveyor belts. The patient is harnessed and can be partially unburdened from his weight. No machine provides for the use of exercises in suspension.

Systems which allow walking on the ground are devises to allow disabled people to move with limited displacements with the help of crutches. They are also declared suitable for a rehabilitation. The patients are not harnessed and cannot be unburdened from their own weight. The walk is generally not physiological and there are balance problems.

Rehabilitation apparatuses are known which allow to move as harnessed and unburdened from the weight with a track, but without exoskeleton.

SUMMARY OF THE INVENTION

Object of the present invention is solving these problems, by providing a system for rehabilitating the walk which allows the use of an exoskeleton on the ground with a patient unburdened from his weight and with a physiological walk; the system of the invention further allows performing walking exercises in air in complete suspension (rehabilitation stage with reordering of walk paradigms); if associated with a conveyor belt allows performing exercises with exoskeleton with a great number of footsteps.

All prior art systems have critical aspects as regards the unburdening of the weight, which must take into account the need of unburdening the weight following the vertical body movements consequent when performing footsteps.

The weight unburdening can be managed in a rather easy way in known rehabilitation apparatuses with fixed station, though with some limit due to the choice of the technical solution; for example, if balancing counterweights are used, strong dynamic actions are generated upon reverting the motion direction.

As regards weight unburdening systems suitable for rehabilitation systems which develop the walk on the ground, prior art devices, developed for different fields of application (walk rehabilitation on the ground without active exoskeleton), are very complex, heavy and costly.

Another object of the present invention is solving these problems, by providing an easy and easily managed solution for rehabilitating the legs with walk on the ground, through a weight supporting device which uses a double electric and pneumatic actuation. This solution allows the controlled unburdening of the weight with a suitably lightweight device to be dragged directly by the active exoskeleton which actuates the walk of the patient on the ground.

The above and other objects and advantages of the invention, as will result from the following description, are obtained with a system for rehabilitating the walk, and a weight supporting device for such system as claimed in the independent claims. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be performed to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
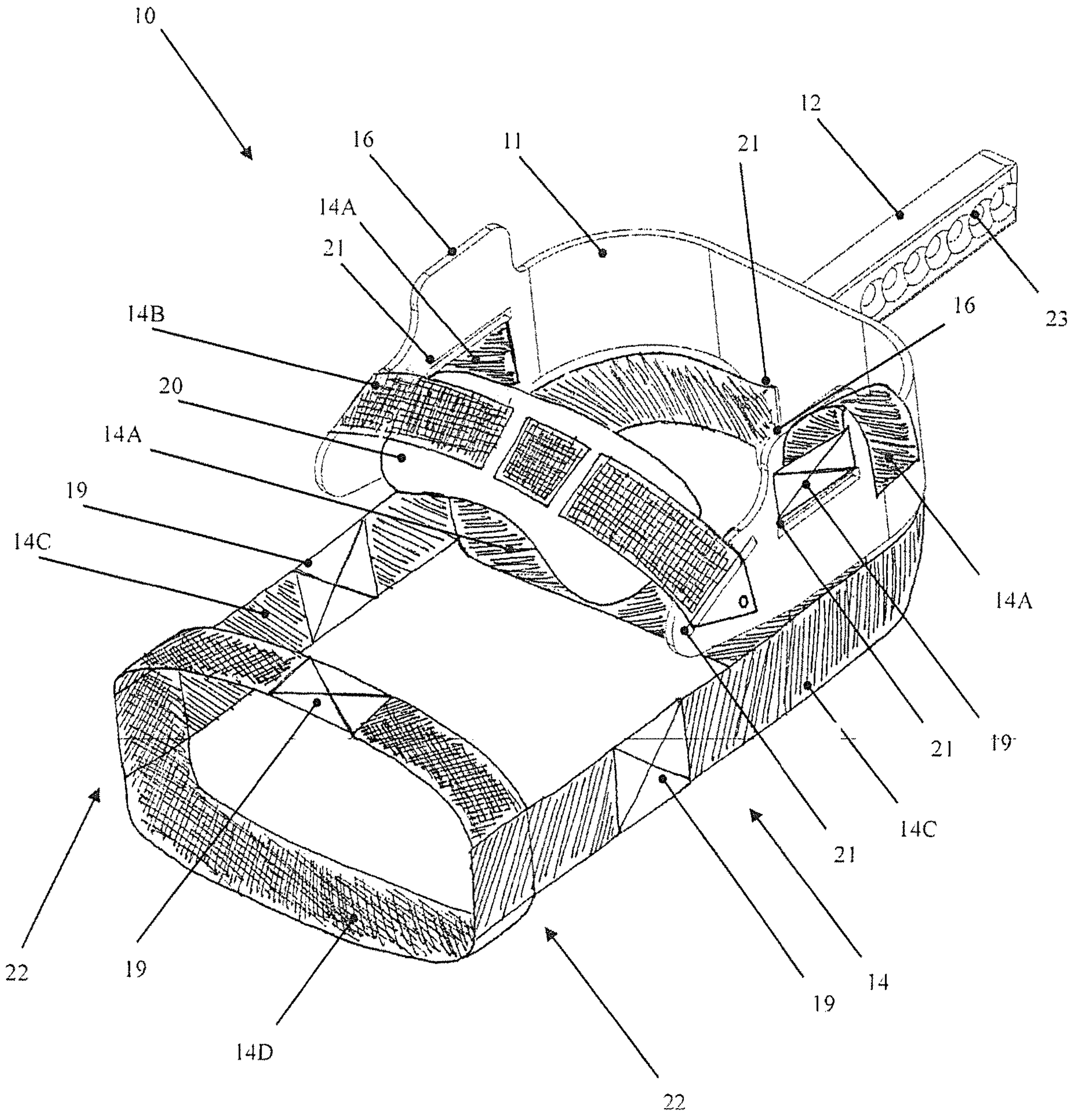
FIG. 1 shows a perspective view of a device for blocking a shoe.
Figure 2:
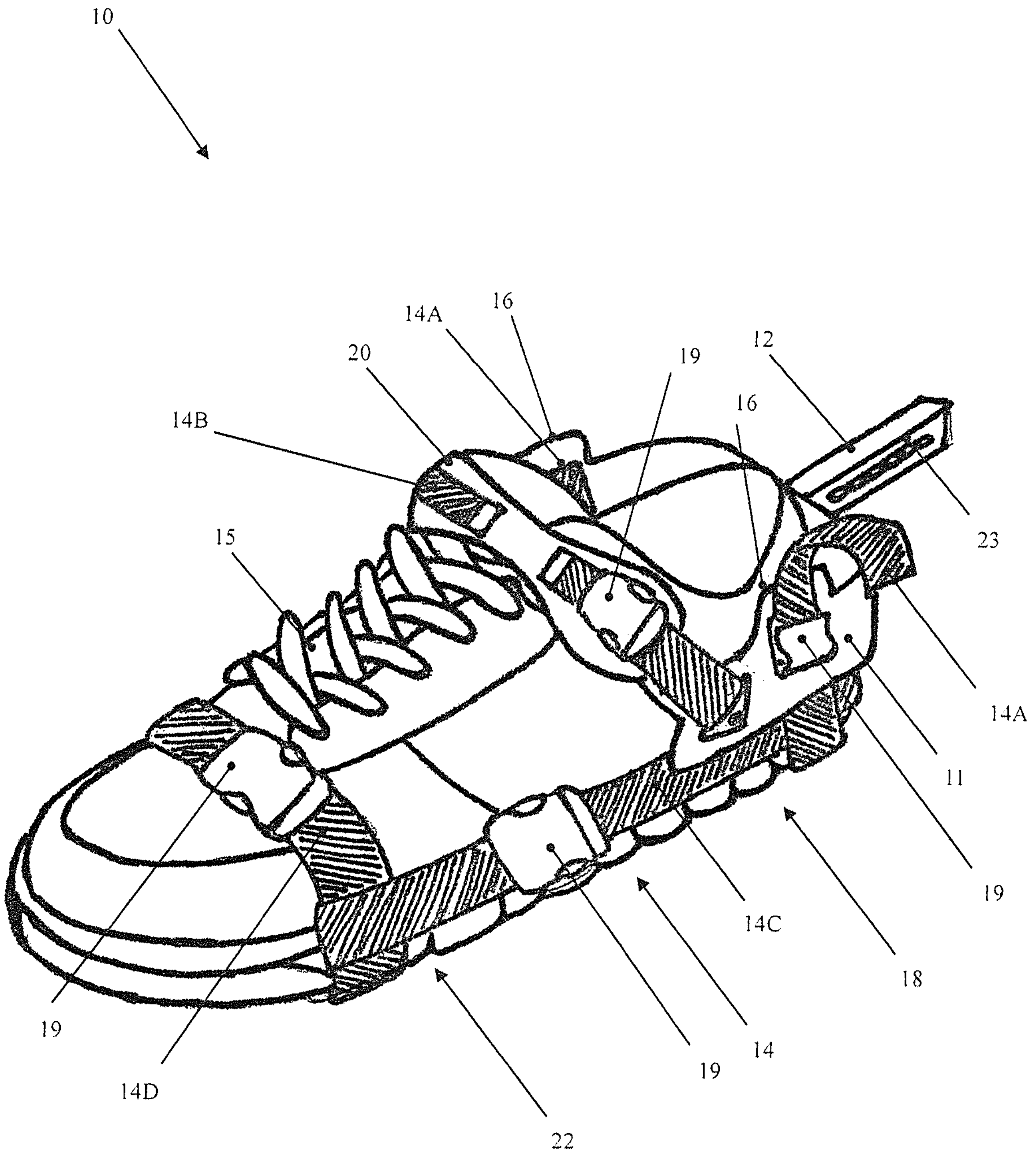
FIG. 2 shows a perspective view of a device for blocking a shoe fastened to a shoe.
Figure 3:
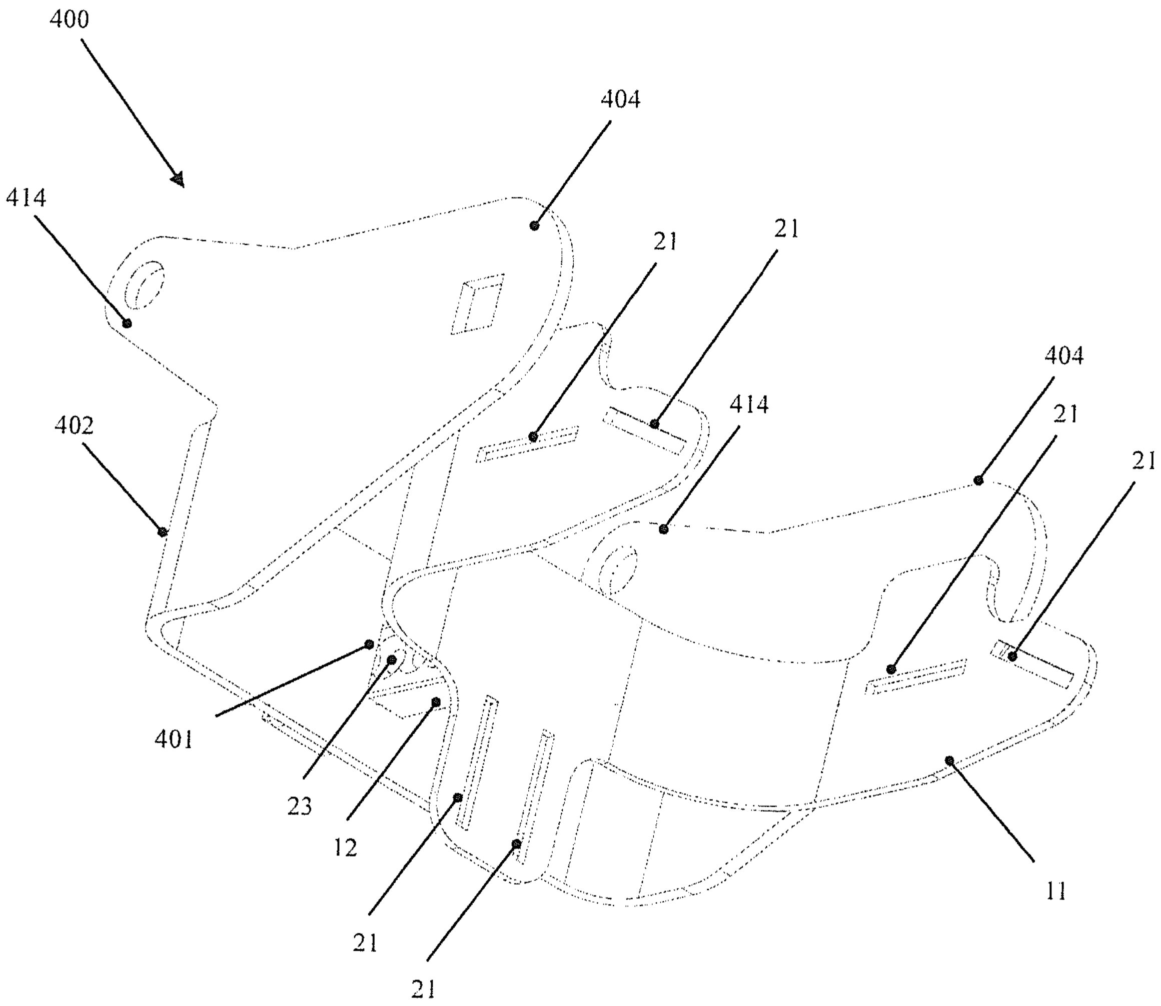
FIG. 3 shows a perspective view of a part of a device for blocking a shoe connected to a bearing and moving structure of a foot.
Figure 4:
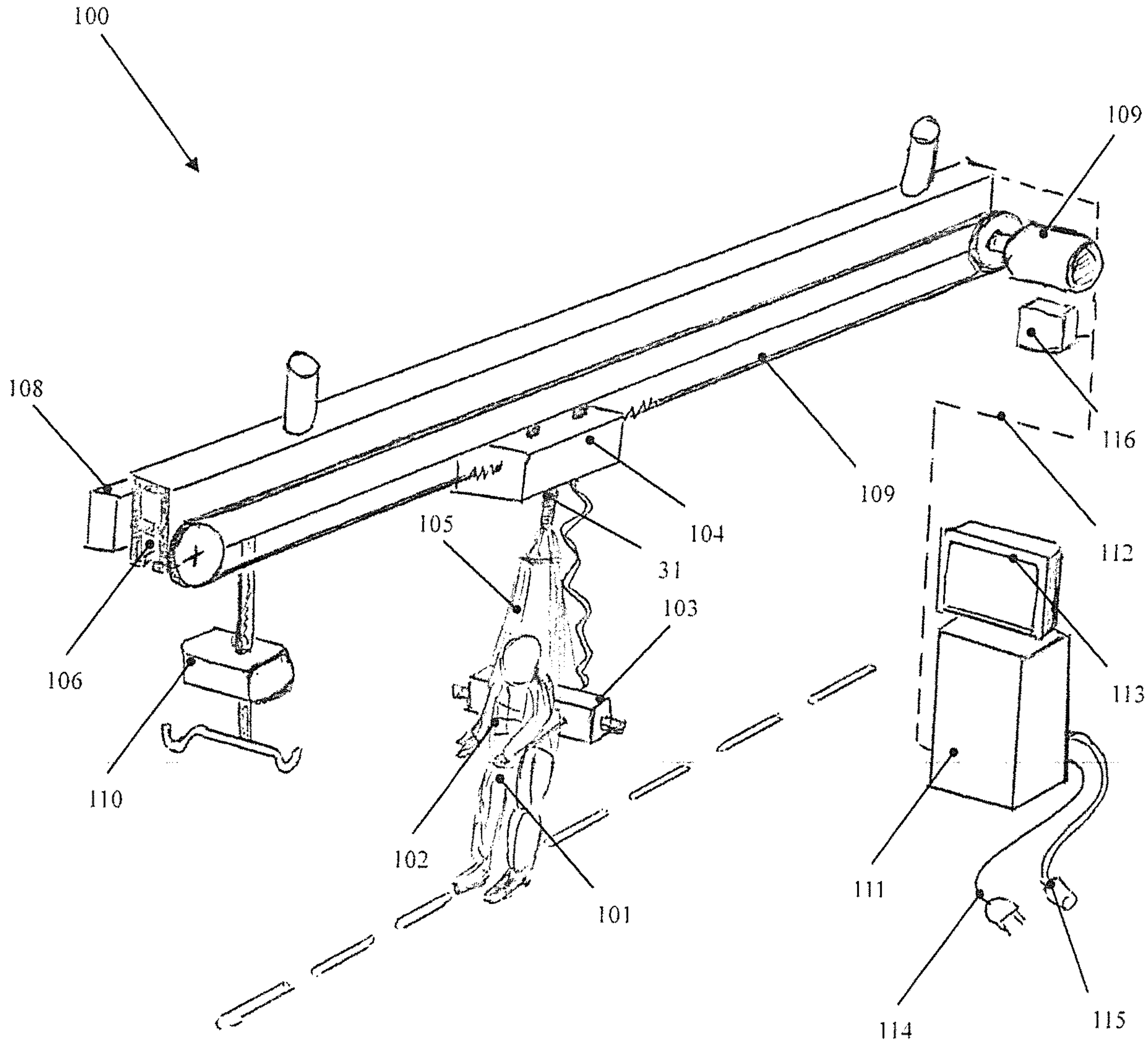
FIG. 4 shows a perspective view of a system for rehabilitating the walk according to the invention.
Figure 5:
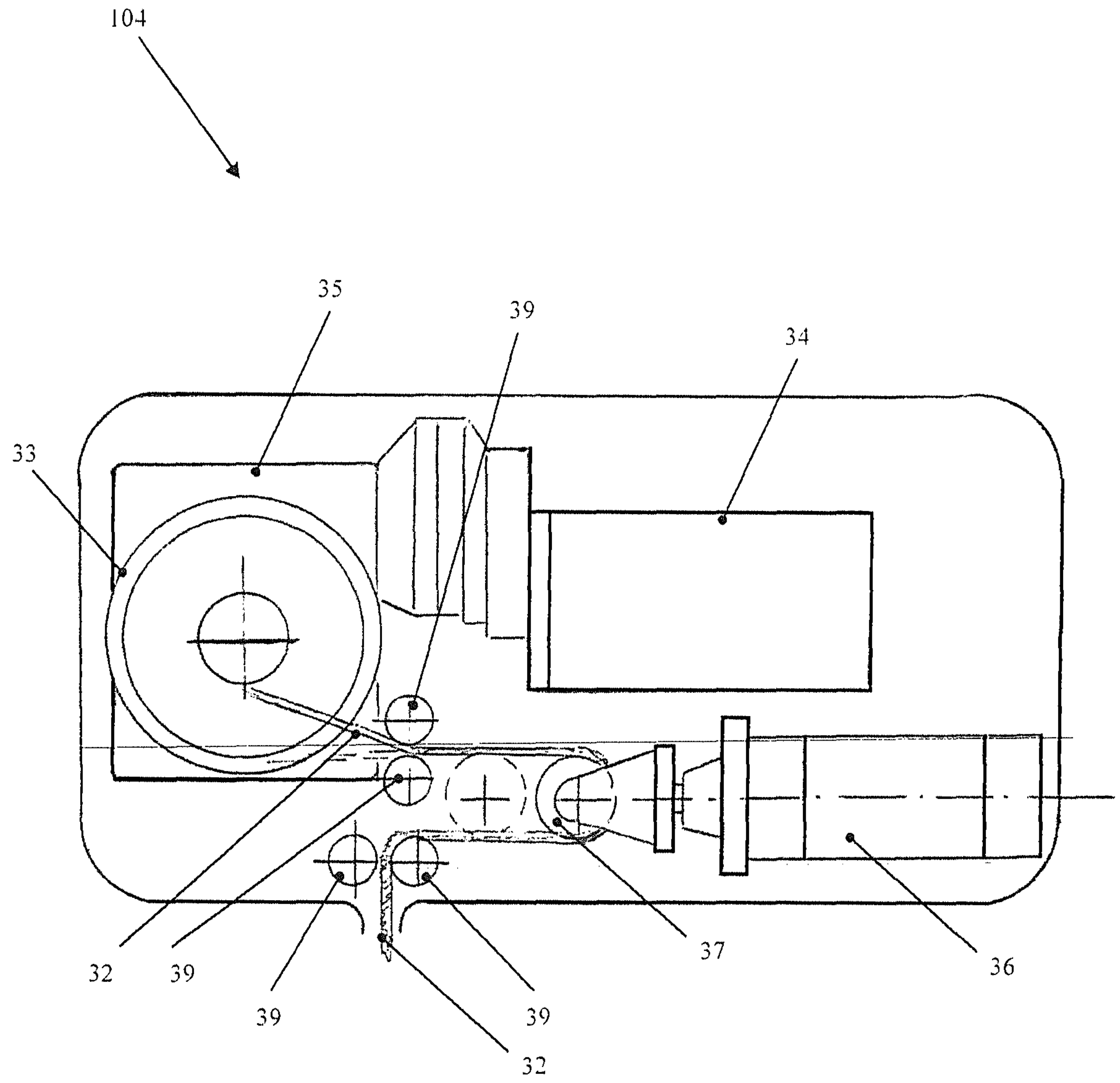
FIG. 5 shows a schematic view of a weight supporting device for a system for rehabilitating the walk according to the invention.
Figure 6:
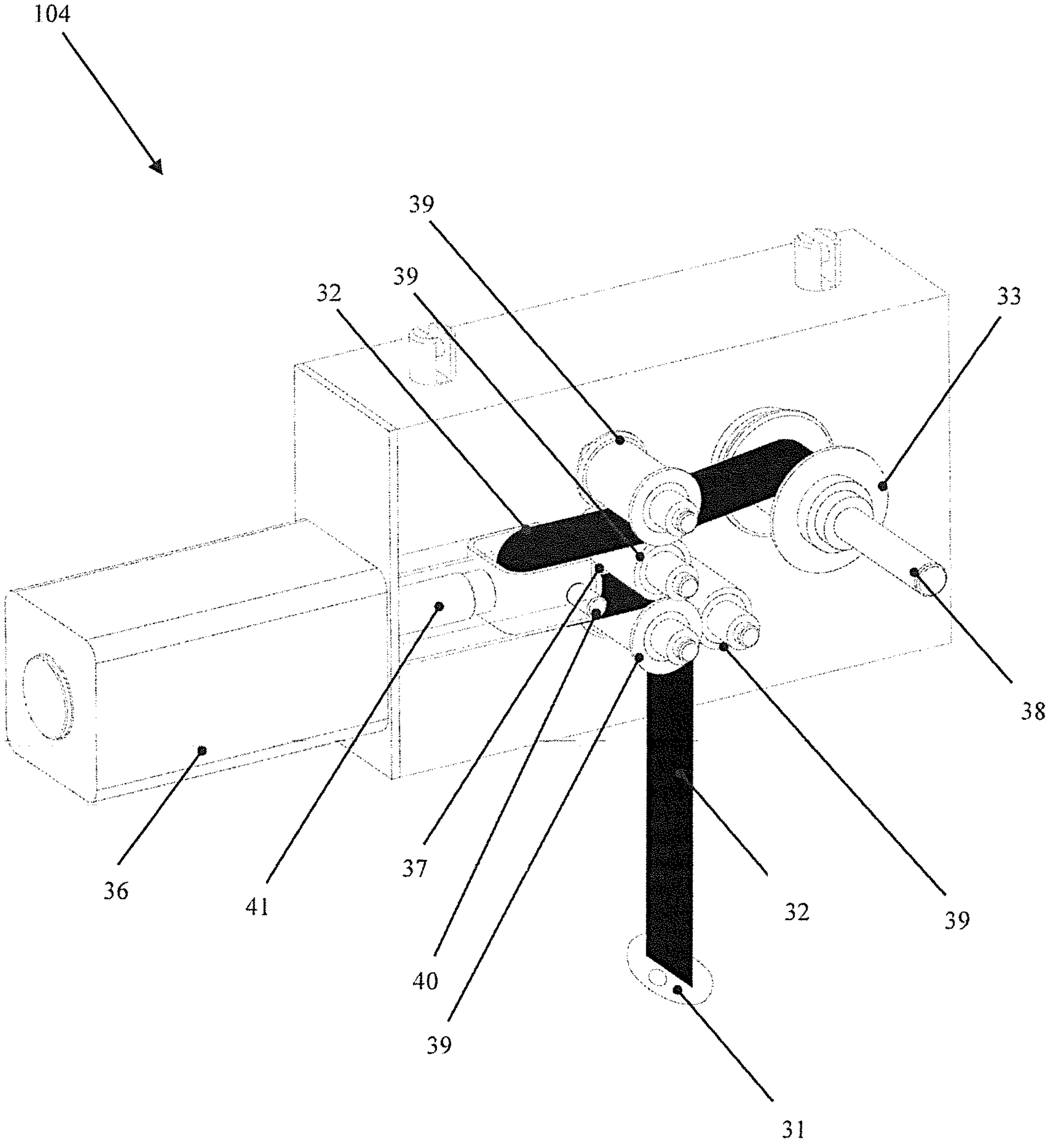
FIG. 6 shows a perspective view of a part of a weight supporting device for a system for rehabilitating the walk according to the invention.

With reference to the Figures, the device 10 for blocking a shoe 15 for an exoskeleton 102 of a system 100 for rehabilitating the walk according to the invention comprises a structure 11 designed to externally wrap the heel of a patient 101, allowing the contact between the sole of the shoe 15 and the ground, the structure 11 comprising a rear element 12 connectable to a bearing and moving structure of a foot 400, a band assembly 14 connected to the structure 11 to strap up and tighten the shoe 15 of the patient 101, in order to make it integral to the device 10, the structure 11 being further shaped in such a way as to comprise a reference 16 to arrange the device 10 in the correct position, centring the reference 16 with the ankle of the patient 101.

Preferably, the band assembly 14 to connect the shoe 15 to the device 10, in particular to the structure 11, comprises: a band or a portion of band 14A connected to the structure 11, for example inserted inside slits 21 obtained in the structure 11, designed to wrap the heel passing below the heel 18 of the shoe 15 and opening, closing and adjusting elements 19 of a known type to adjust its length in order to guarantee the vertical position of the device 10, making the reference 16 coincide with the centre of the ankle of the patient 101; a band or a portion of band 14B connected to the structure 11, for example inserted inside slits 21 obtained in the structure 11, designed to pass on the neck of the foot of the patient 101, preferably using an abutment bearing 20 to distribute the load on the neck of the foot, and comprising opening, closing and adjusting elements 19 of a known type to adjust its length in order to obtain an adequate closure on the foot; a band or a portion of band 14C connected to the structure 11, preferably in its rear part, for example inserted inside slits 21 obtained in the structure 11, having two ends 22 placed towards the tip of the foot; a ring-shaped band or a portion of band 14D to which the ends 22 are connected, designed to tighten the foot next to the phalanxes and comprising opening, closing and adjusting elements 19 to adjust its length, the ends 22 can also be adjusted in their length through opening, closing and adjusting elements 19 in order to allow a correct positioning of the ring-shaped band or portion of band 14D immediately downstream of the phalanxes on the metatarsus.

Preferably, the structure 11 comprises a reference of the centre of the heel obtained by shaping the upper profile of the structure 11 next to the heel.

Preferably, the rear element 12 for connecting to the bearing and moving structure of a foot 400 is obtained through a tubular element or a rod 12, built in such a way as not to have an axial symmetry, in order to locate an accurate angular position with the bearing and moving structure of a foot 400, for example by being inserted into a corresponding hollow element 401 with a suitable length, which has inside a hole without axial symmetry capable of being coupled to the element 12, obtained on an oscillating lever 402 of the bearing and moving structure of a foot 400, preferably shaped as a “U”, which wraps on the rear the foot and is connected to the structure 11 of the device for blocking a shoe 10; the sliding of the rod 12 inside the hollow element 401 allows recording the position of the shoe in the sagittal plan with respect to the bearing and moving structure of a foot 400; the rear element 12 is further equipped with a fastening system which avoids its spontaneous withdrawal, for example through pins or screws inserted inside a hole, of a group of holes 23 obtained in the rear element 12, which coincides with a locking hole obtained in the hollow element 401 in the chosen position.

With reference to the Figures, the system 100 for rehabilitating the walk according to the invention comprises an active exoskeleton 102 of a known type, for example with six degrees of freedom to move the two hips, the two knees and the two ankles of the patient 101, comprising a supporting structure 103 for the right leg and left leg, preferably a supporting structure 103 for regulating the distance between right leg and left leg, a bearing and moving structure 200 for a femur of the patient 101 connected in a rotary way to the supporting structure 103, a bearing and moving structure 300 for a tibia of the patient 101, with respect to the femur, connected in a rotary way to the bearing and moving structure for a femur 200, the bearing and moving structure for a foot 400 of the patient 101, with respect to the tibia, connected in a rotary way to the bearing and moving structure for a tibia 300.

The bearing and moving structure for a foot 400 of the patient 101 can be of a known type, or be designed to be connected and disconnected to and from the device 10 for blocking a shoe, which allows the patient 101 to walk with his own shoes.

In a known way, the bearing and moving structures 200, 300, 400 comprise supporting means, composed for example of metallic guides and/or of sliders made of plates made of harmonic steel, and handling means composed for example of pneumatic cylinders.

In an embodiment, the active exoskeleton 102 of the system 100 for rehabilitating the walk comprises the bearing and moving structures for a femur 200 and for a tibia 300 preferably comprising elastic plates 203, 303 connected to respective electromechanical actuating means 204, 205, 206 and 304, 305, 306 for regulating the lengths of the femur and tibia sections, in order to allow movements on the front plane to enable adapting the active exoskeleton 102 to patients with different configurations.

Preferably, the active exoskeleton 102 further comprises means for electronically acquiring data about the lengths of the femur and tibia sections, associated with the electromechanical actuating means 204, 205, 206 and 304, 305, 306 for regulating the lengths of the femur and tibia sections and consequently electronically acquiring the data, and electronic inclination sensors for adjusting the attitude of the exoskeleton 102 and for acquiring related data in a computerized way.

Figure 8A:
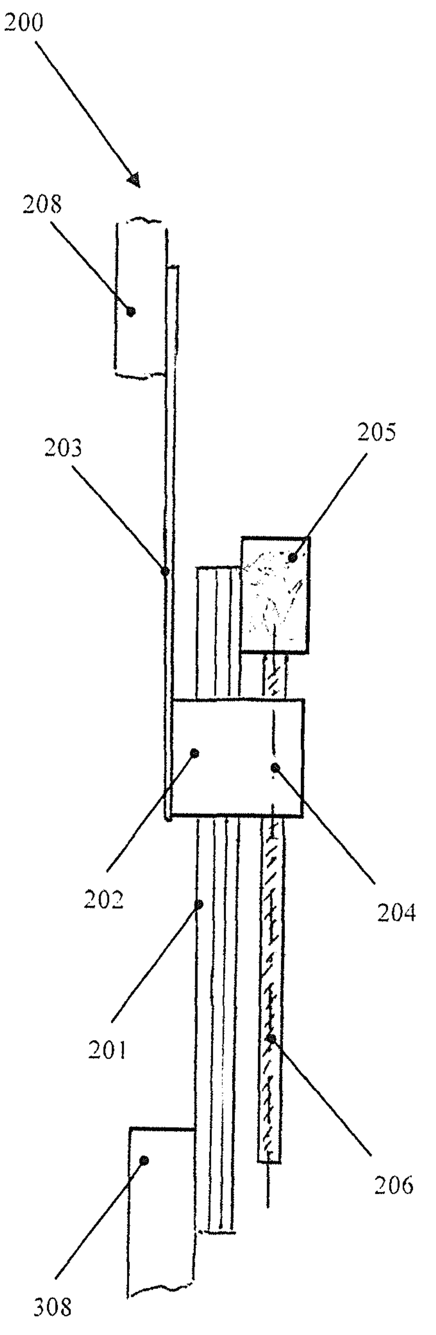
FIG. 8 shows a schematic view of a part of an exoskeleton.
Figure 8B:
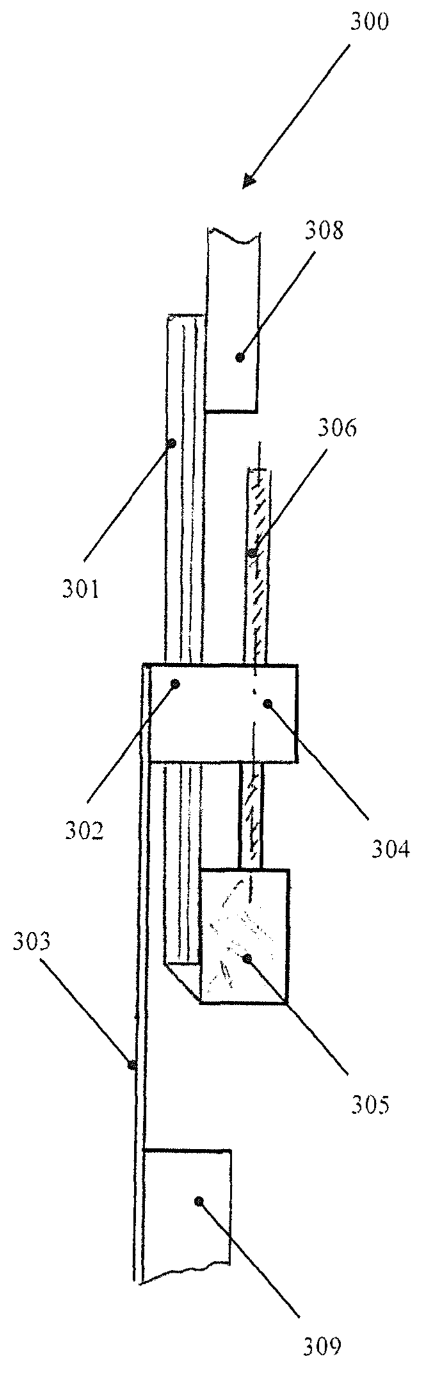
Figure 9:
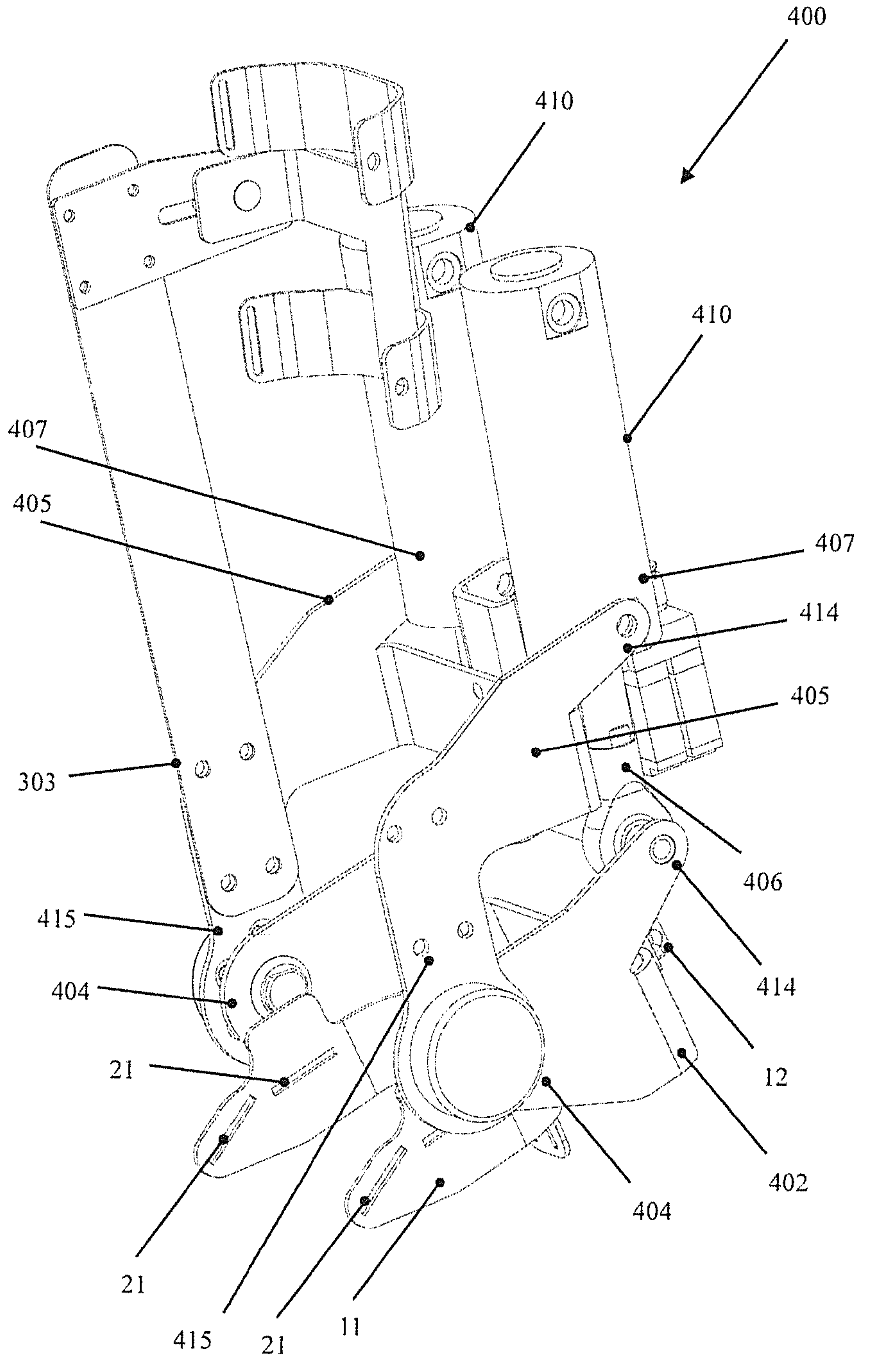
FIG. 9 shows a perspective view of a part of an exoskeleton.

In a preferred embodiment of the invention, the active exoskeleton 102 comprises the bearing and moving structures for a femur 200 and for a tibia 300, schematically shown in FIGS. 8*a* and 8*b* and in turn comprising respective elastic plates 203, 303, each connected to a respective ball carriage 202, 302.

In particular, in an embodiment which provides for the electric adjustment of the lengths of the bearing and moving structures for a femur 200 and for a tibia 300, FIG. 8*a* shows the principle diagram in case of an adjustment of the femur section, while FIG. 8*b* shows the tibia section.

The bearing and moving structures for a femur 200 and for a tibia 300 each comprise a rigid guide 201, 301 connected to a respective ball carriage 202, 302; such ball carriage 202, 302 being fastened to the end of an elastic plate 203, 303 and to a nut 204, 304, through connecting elements of a known type. The other end of the elastic plate 203, 303 is fastened to a joint o the exoskeleton, respectively a hip joint 208 or an ankle joint 309, while the rigid guide 201, 301 is fastened to a knee joint 308.

The bearing and moving structures for a femur 200 and for a tibia 300 each comprise an electric motor-reducer 205, 305 fastened to the rigid guide 201, 301, connected to a screw 206, 306 and designed to rotate it to perform the adjustment of the length of the bearing and moving structures for a femur 200 and for a tibia 300. The screw 206, 306, when rotating, linearly moves the nut 204, 304, integral with the ball carriage 202, 302. For example, in the relative movement between screw 206 and nut 204, when the nut 204 moves far away from the electric motor-reducer 205 (FIG. 8*a*) tutto the gruppo formato da electric motor-reducer 205, rigid guide 201 and knee joint 308 are lifted, reducing the length of the bearing and moving structure of a femur 200.

Preferably, the active exoskeleton 102 comprises the bearing and moving structure for a foot 400 comprising two pneumatic cylinders 410 in parallel, for moving the foot and the ankle, which are placed on the rear to the heel and connected, preferably hinged, to a lever 405 and to the oscillating lever 402 which wraps the foot on the rear and is connected to the removable device for blocking a shoe 10, in particular to the structure 11, through the rear element 12.

In a preferred way, the pneumatic cylinders 410 comprise an axially moving shaft 406 having an end connected, preferably hinged, to the oscillating lever 402 and a head 407 connected, preferably hinged, to the lever 405; in a preferred way, the oscillating lever 402 is shaped as a "U" and comprises two first arms 404 connected, preferably hinged, to the lever 405, and two second arms 414 connected, preferably hinged, to the shafts 406 of the pneumatic cylinders 410.

Preferably, the lever 405 is shaped as a "U" and comprises two first arms 415 connected, preferably hinged, to the oscillating lever 402, in a preferred way to the first arms 404, and comprises two second arms 414 connected, preferably hinged, to the heads 407 of the pneumatic cylinders 410.

Preferably, the bearing and moving structure for a foot 400 further comprises the elastic plate 303 having an end connected, preferably fastened, to the ball carriage 302 of the bearing and moving structure for a tibia 300.

The other end of the elastic plate 303 is connected, preferably fastened, to the lever 405, in a preferred way to a first arm 415.

In a preferred embodiment of the invention, the system 100 for rehabilitating the walk according to the invention comprises an active exoskeleton 102 of a known type, a weight supporting device (BWS) 104 which allows lifting or lowering the patient 101 and the active exoskeleton 102 to which he is associated, in order to place the patient 101 in contact with the ground in a suitable position to allow walking exercises, the BWS 104 ending with a structure connected to means 105 for supporting the exoskeleton and the patient, comprising a harness for the exoskeleton 102 which allows supporting its weight without discharging it onto the patient, a wearable and adjustable harness for supporting the patient, preferably with bands for supporting the groins and a corsage for supporting the torso of the patient, the harness being suitably arranged to be connected to the active exoskeleton 102 and to the BWS 104; handling means 106 connected to the BWS 104, to allow its movement; means 108 for transmitting electric and pneumatic supplies, electric signals for managing, controlling, monitoring and diagnosing the whole system, to the BWS 104; a managing system 111 comprising a microprocessor, for example of a computer, for acquiring and processing data, and managing a session of neuro-rehabilitation motion.

Preferably, the managing system 111, for example a box on the ground, comprises the general pneumatic 115 and electric 114 supplies, electro-pneumatic circuits, a computer comprising electronic cards, memories of a known type, preferably a touch-screen 113 for managing and monitoring the walking exercises; an electro-pneumatic system for the actuations of the exoskeleton joints and of the oscillation system of the patient's torso in the walk on the ground; an electronic system for managing, controlling, acquiring data, monitoring and locally and remotely diagnosing, preferably comprising hardware emergency systems, backup battery, hanging pushbutton panel from BWS, controlling pushbutton panel for local actuations, touch-screen, electronic cards, power supplies and data transmission lines, with distributed hardware between box 111, exoskeleton 102, BWS 104, an assembly 116 for managing the BWS movement and electric and pneumatic interconnection lines 112; the system 100 for rehabilitating the walk according to the invention further comprises a managing software. Furthermore, the BWS 104 may include a housing connected to the handling means. The housing may encase the band collecting pulley, the actuating means, and at least a portion of the lifting band.

Preferably, the handling means 106 comprise guiding means 106, for example a track, preferably fastened to a ceiling, and the BWS 104 is associated with the guiding means 106 in a sliding way to allow its movement, for example by means of small sliding carriages; the means for transmitting electric and pneumatic supplies and electric signals 108 are for example a known cable-holder chain, containing the connection cables of the BWS 104 at an end of the guide track; in a preferred way, the system 100 for rehabilitating the walk according to the invention further comprises dragging means 109 for the automatic movement of the BWS 104 with known speed and/or thrust force control, comprising for example a metallic wire tensioned by springs, with a free returning pulley, a driving pulley actuated by an electric motor-reducer, preferably of the torque-controlled type; means for measuring the position of the exoskeleton 102, for example a laser measure sensor, to know the position of the exoskeleton 102 at the beginning and when performing the walking exercises, in order to correctly manage the number of footsteps to be walked before arriving at the end of the guide track 106 of the exoskeleton 102; a second, auxiliary BWS 110 of the prior art, for example comprising a handle for lifting the patient 101, which allows harnessing the standing patient 101, dressing the device 10 for blocking a shoe or lifting the patient 101 once harnessed and having worn the device 10 for blocking a shoe when sitting or on a carriage, to then transfer the patient 101 to the BWS 104 which already supports the exoskeleton 102, perform the necessary adjustments of the femur and tibia sections and connect the patient 101 to the exoskeleton 102 to perform the walking exercises.

In a preferred embodiment, the system 100 for rehabilitating the walk according to the invention comprises a weight supporting device (BWS) 104 with a double electric and pneumatic actuation which allows lifting or lowering the patient 101 and the active exoskeleton 102 to which he is associated, in order to place the patient 101 in contact with the ground in a position suitable to allow walking exercises with a predefined weight unburdening value and with the natural torso oscillation, or to lift him completely from the ground for walking exercises in air, or to allow the rotation of the patient by 180° at the end of a path on the ground and begin a new walking exercise.

Advantageously, the system 100 for rehabilitating the walk according to the invention allows performing exercise capable of positively dealing with different situations and different rehabilitation stages.

In particular, it allows performing exercises in a complete suspension, to enable re-ordering the walk mechanisms, and walking exercises on the ground, with a physiologic walk and with partial weight unburdening, improving the movement perception and progressively loading the muscles; it further allows performing prolonged exercises, if associated with the use of a conveyor belt.

In a preferred embodiment of the system 100 for rehabilitating the walk according to the invention, the weight supporting device, or BWS 104 of the system 100 for rehabilitating the walk according to the invention uses a double electric and pneumatic actuation and, to lift or lower the patient 101 and the exoskeleton 102, it comprises a suspension element 31 connected to a side through the means 105, comprising for example suitable bands and harnesses, to the exoskeleton 102 and to the patient 101 and connected on the other side to a lifting band 32; the BWS 104 further comprises a band collecting pulley 33, actuated by actuating means, for example composed of an electric motor 34 connected to a reducer 35, around which the lifting band 32 is wound to change its length till the final blocking in the desired position.

In order to allow a good performance of the walking exercises on the ground, allowing the natural vertical movement of the patient's body, the BWS 104 also comprises a second device 36 of a pneumatic type, for example a pneumatic cylinder 36 having an axially moving shaft 41, connected to a moving pulley 37 around which the lifting band 32 is wound before arriving at the collecting pulley 33, which allows the free vertical movement of the patient 101 starting from a starting position, with a constant weight unburdening force.

Advantageously, such device 36 of a pneumatic type, for example due to the use of the pneumatic cylinder 36 which works at a constant pressure, allows applying an absolutely constant unburdening force and, due to the yield of the pneumatic system, allows a comfortable actuation for the patient 101, avoiding vibrations or sudden movements, in particular in the motion reversal step.

In the walk in air, instead, only the movement of the actuating means 34, 35 of the band collecting pulley 33 is used, for example of the electric motor 34, to lift from the ground exoskeleton 102 and patient 101 in a certain position which is not modified during the exercises.

The weight supporting device (BWS) 104 preferably comprises the electric motor 34 which actuates the reducer 35, for example of the irreversible type, connected through an output shaft 38 to the collecting pulley of the band 33. The lifting band 32 going out of the collecting pulley of the band 33 passes through two returning pulleys 39, in order to always be horizontal, before being wound on the moving pulley 37 moved by a shaft 40 connected to the shaft 41 of the pneumatic cylinder 36, to be then rotated, through two further returning pulleys 39, from an horizontal to a vertical direction and be connected to the active exoskeleton 102 and to the patient 101. The pneumatic cylinder 36 comprises a rear chamber 54 which is constantly at the atmospheric pressure, and a front chamber 53 which is pressurized, at an adequate level to provide, on the end of the lifting band 32 connected to the exoskeleton 102 and to the patient 101, a force equal to the weight of the exoskeleton 102 and to the amount of weight of the patient 101 which must be unburdened. Given the configuration with moving pulley 37, the value of the force produced by the pneumatic cylinder 36 is double what is required and its stroke is half of the vertical stroke necessary to oscillate the patient 101 in his walk on the ground.

Figure 7:
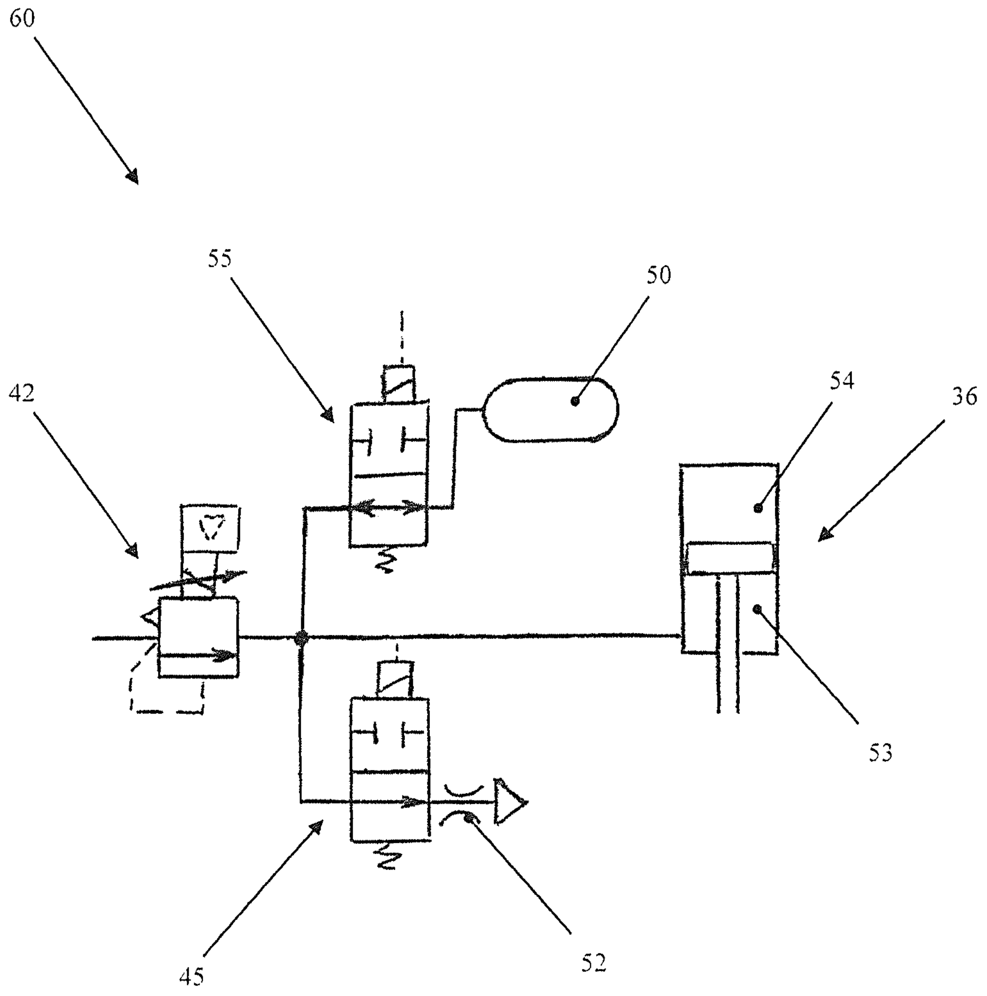
FIG. 7 shows a schematic view of a part of a weight supporting device for a system for rehabilitating the walk according to the invention.

FIG. 7 shows an example of an electro-pneumatic circuit 60 for controlling the cylinder 36. For regulating the pressure, the front chamber 53 of the cylinder is connected to a proportional solenoid valve 42 which changes the pressure according to what is required.

Preferably, the front chamber 53 of the cylinder can be connected to a tank 50 with ad adequate volume according to the prior art, for an operation under energy saving conditions, which avoids filling and emptying the front chamber 53 during every walking cycle, and obtaining a neglected pressure variation in the front chamber 53 of the cylinder when the patient 101 walks. Optionally, a solenoid valve 45 can be added (for example having two mouths and two positions, mono-stable, normally open) with a load resistance 52 to empty the pneumatic circuit 60 under emergency conditions.

Advantageously, the lifting and weight unburdening cylinder 36 can be used to lift the patient 101 from the ground at the end of the path allowed by the track, without requiring the addition of other control elements which would be necessary in case of intervention of the electric motor 34, in order to allow the 180° rotation of the patient 101, and to take him back afterwards to the ground in the same vertical position before his lifting, to start a new walking exercise. This is obtained in a simple way, dimensioning the lifting and weight unburdening cylinder 36 with a longer stroke that a strictly necessary one to allow an oscillation during the walk to the ground and increasing the pressure in the front chamber 53 for his lifting. Following this solution, a solenoid valve 55 can be advantageously added (for example having two mouths and two positions, monostable, normally open) to avoid filling the tank 50 with compressed air, when the lifting operation of the patient 101 has been performed at the end of the path.

Advantageously, the weight supporting device (BWS) 104 of the invention, due to the use of the second pneumatic device 36 which works at a certain pressure and due to the compressed air yield, allows applying a constant unburdening force in a way which is always comfortable for the patient 101, avoiding vibrations or sudden movements, in particular in the motion reversal stage.

Advantageously, the rehabilitation is greatly improved, since it allows not only assigning the correct motion law to the ankle movement, but also the perceptions of the contact, useful to make the patient acquire again his capability of improving his own walk with a correct and quick rehabilitation.

The use of a pneumatic device further generates a comfortable movement for the patient, increasing his appreciation towards the rehabilitation treatment.

The invention claimed is:

1. A system for rehabilitating a walk comprising:

an active exoskeleton comprising:

a supporting structure for a right leg and a left leg, a first bearing and moving structure for a femur of the patient, the first bearing and moving structure rotatably connected to the supporting structure, a second bearing and moving structure for a tibia of the patient with respect to the femur, the second bearing and moving structure rotatably connected to the first bearing and moving structure, a third bearing and moving structure for a foot of the patient with respect to the tibia, the third bearing and moving structure rotatably connected to the second bearing and moving structure;

a weight supporting device configured to permit lifting or lowering the patient and the active exoskeleton associated thereto in order to place the patient in contact with the ground in position to perform walking exercises, the weight supporting device connected to means for supporting the exoskeleton and the patient;

handling means connected to the weight supporting device to allow movement of the weight supporting device;

means for transmitting electric and pneumatic supplies and electric signals for managing, controlling, and monitoring the system to the weight supporting device;

a managing system comprising a microprocessor to acquire and process data, and to manage a motion neuro-rehabilitating session;

the weight supporting device comprising:

a suspension element connected on a side to the exoskeleton and to the patient through the means for supporting the exoskeleton, and connected on another side to a lifting band of the weight supporting device; and a pair of returning pulleys; and a band collecting pulley actuated by actuating means, around which the lifting band is wound to change a length of the lifting band till a final locking in the desired position; and a housing connected to the handling means, the housing encasing the band collecting pulley, the actuating means, and at least a portion of the lifting band; and the weight supporting device further comprising: a pneumatic device connected to a mobile pulley around which the lifting band is wound before getting to the band collecting pulley, which allows the free vertical movement of the patient starting from an initial position, with a constant weight relieving force, to allow a comfortable actuation for a patient; and wherein the pair of returning pulleys are disposed between the band collecting pulley and mobile pulley.

2. The system of claim 1, wherein the handling means comprise guiding means, and the weight supporting device is sliding associated to the guiding means to allow movement of the weight supporting device.

3. The system of claim 2, wherein the guiding means comprise a rail.

4. The system of claim 1, further comprising dragging means for automatically moving the weight supporting device with a check on speed and/or thrusting force, and comprises means for measuring a position of the exoskeleton to know the position of the exoskeleton at the beginning and when performing walking exercises, in order to correctly monitor the number of footsteps to be performed.

5. The system of claim 1, further comprising an auxiliary weight supporting device, which allows harnessing the patient standing and is configured to lift the patient once harnessed and transfer the patient to the weight supporting device which already supports the exoskeleton; the auxiliary weight supporting device is further configured to perform the necessary adjustments of the femur and tibia sections and/or connect the patient to the exoskeleton to perform walking exercises.

6. The system of claim 1, wherein the system comprises both electric and pneumatic actuation which allows lifting or lowering the patient and the active exoskeleton associated thereto.

* * * * *